US012547499B2

(12) United States Patent
Tew et al.

(10) Patent No.: US 12,547,499 B2
(45) Date of Patent: Feb. 10, 2026

(54) DATA STORAGE MANAGEMENT BASED ON USER CALENDAR EVENTS (71) Applicant: SanDisk Technologies, Inc., Milpitas, CA (US)

(72) Inventors: Wei Hong Tew, Penang (MY); Tze Ping Chan, Penang (MY); Jun Jeen Heng, Perak (MY)

(73) Assignee: Sandisk Technologies, Inc., Milpitas, CA (US)

(*) Notice: Subject to any disclaimer, the term of this patent is extended or adjusted under 35 U.S.C. 154(b) by 0 days.

(21) Appl. No.: 18/750,880

(22) Filed: Jun. 21, 2024

(65) Prior Publication Data
US 2025/0390393 A1 Dec. 25, 2025

(51) Int. Cl.
G06F 11/14 (2006.01)
(52) U.S. Cl.
CPC ...... G06F 11/1451 (2013.01); G06F 11/1461 (2013.01); G06F 11/1464 (2013.01)
(58) Field of Classification Search
CPC .......................... G06F 11/1451; G06F 11/1461
USPC ........................................................... 716/3
See application file for complete search history.

(56) References Cited

U.S. PATENT DOCUMENTS

| 6,769,120 | B1 | 7/2004 | Rodriguez |
| 9,894,510 | B1 | 2/2018 | Kortunov et al. |
| 11,258,853 | B2* | 2/2022 | Bono .................. H04L 67/1097 |
| 2007/0106713 | A1* | 5/2007 | Allen .................. G06F 11/1448 |
| 2022/0188342 | A1 | 6/2022 | Bedadala |

* cited by examiner

Primary Examiner — Yair Leibovich
(74) Attorney, Agent, or Firm — Patterson + Sheridan, LLP (57) ABSTRACT A host system configured to manage data storage can include one or more processors, individually or in combination, configured to: determine a calendar event associated with a user that is expected to use data storage on storage media of the host system; determine at a specified time before a start time of the calendar event whether an amount of available storage on the storage media satisfies a threshold amount; and in response to determining that the amount of available storage on the storage media does not satisfy the threshold amount: identify one or more files to back up to one or more of a cloud server or an external data storage device; copy the one or more files to one or more of the cloud server or the external data storage device; and delete the one or more files from the storage media.

20 Claims, 6 Drawing Sheets

DATA STORAGE MANAGEMENT BASED ON USER CALENDAR EVENTS

BACKGROUND

Field

This disclosure relates to data storage management on devices, such as hosts and/or data storage devices. More particularly, the disclosure relates to devices and methods for data storage management based on calendar events associated with users.

Description of Related Art

Users may require large amounts of storage on devices when attending certain events, such as concerts or sports games. However, users may not have sufficient storage on their devices and may need to delete data or attempt to back up data to external storage or cloud storage at the last minute, which many not lead to an optimal user experience.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

In some cases, a user may attend events that utilize a large amount of storage on the user's device (e.g., a mobile phone), such as concerts or sports games. However, the user may find at the event that the device does not have sufficient amount of storage to save large files, such as video files and photos. The user may need to delete existing files or copy files to a cloud server or an external data storage device. However, trying to connect and copy files to a cloud server at a high attendance event may be difficult. In addition, trying to connect and copy files to an external data storage device at an event may require attention and effort.

According to certain aspects, a host system can be configured to provide data storage management based on user calendar events. The host system can check a user's calendar to determine whether upcoming events are likely to require large amounts of storage. After identifying such an event, the host system can check at a specified time prior to the start of the event whether there is a sufficient amount of storage available on the host system. If the host system does not have a sufficient amount of storage available for the event, the host system can prompt the user to back up files to cloud storage and/or an external data storage device. The host system can identify one or more files for backup, copy the files to the cloud storage and/or the external data storage device, and delete the files from the host system. The backed up files may be restored after the event if the user wishes to restore the files. In this way, the host system can automatically ensure that sufficient storage available in anticipation of an event requiring large amounts of data and improve user experience for the event. Details relating to data storage management based on user calendar events are further explained below in connection with FIGS. 1-5. In some embodiments, components in FIGS. 1-5 having similar names and/or reference numbers may be the same or similar to each other.

Data Storage Management Based on User Calendar Events

Figure 1:
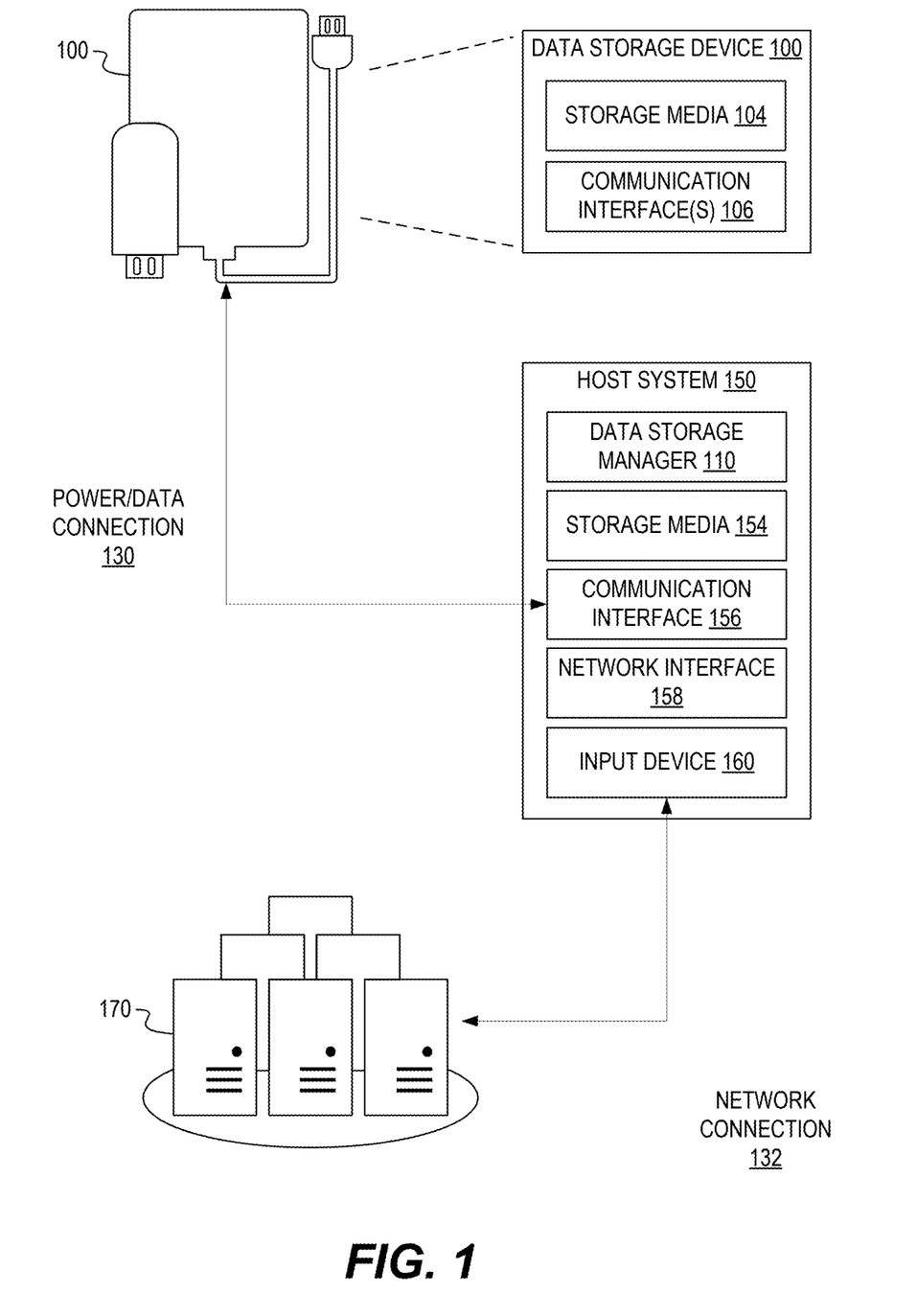
FIG. 1 illustrates a block diagram of a data storage device and a host system configured to provide data storage management based on user calendar events, according to certain embodiments.

FIG. 1 illustrates a block diagram of a data storage device 100 and a host system 150 configured to provide data storage management based on user calendar events, according to certain embodiments. The host system 150 can include a data storage manager 110, storage media 154, a communication interface 156, a network interface 158, and an input device 160. The storage media 154 can store data files and can include a solid-state drive (SSD), solid-state hybrid drive (SSHD), hard disk drive (HDD), or the like. The communication interface 156 can provide a power and/or a data connection 130 to the data storage device 100. For example, the communication interface can be a Universal Serial Bus (USB) port and associated controller. The network interface 158, such as Wi-Fi, Bluetooth, or ethernet, can enable the host system 150 to send data to and/or receive data from network servers 170 over a network connection 132. For instance, the host system 150 can communicate with various networks, such as the Internet, a wide-area network, or other networks. The host system 150 may be a computer, laptop, mobile device, or the like.

The data storage manager 110 can be configured to provide data storage management based on user calendar events. The data storage manager 110 can check a user's calendar to determine whether upcoming events are likely to require large amounts of storage. The data storage manager 110 may determine such events based on various criteria, such as event type, venue, potential attendance, etc. To facilitate discussion, events expected to require large amounts of storage can be referred to as "large data events." After identifying a large data event, the data storage manager 110 can check at a specified time prior to the start of the event whether there is a sufficient amount of storage available on the storage media 154. For instance, the sufficient amount may be determined based on the expected amount of data from the event. If the storage media 154 does not have a sufficient amount of storage available for the event, the data storage manager 110 can prompt the user to back up files to cloud storage and/or an external data storage device. The data storage manager 110 can identify one or more files for backup and receive user confirmation. Then, the identified files for backup can be copied to the cloud storage and/or the external data storage device and deleted from the storage media 154. The data storage manager 110 may note the original locations of the backed up files such that the files can be restored to the original locations on the storage media 154 if the user wishes to restore the files after the event is over. For instance, some or all of the backed up files can be restored if storage is available on the storage media 154 after the event. By providing advance notice and facilitating making storage available on the storage media 154, the data storage manager 110 can ensure that sufficient storage available in anticipation of a large data event and can improve user experience for the event. Details relating to the data storage manager 110 and data storage management based on user calendar events are further explained below in connection with FIGS. 2-5.

The data storage device 100 can include storage media 104 and a communication interface 106. The data storage device 100 can be external to the host system 150. Various types of external data storage devices 100 can be used. The data storage device 100 can receive power from the host system 150 and then receive files from or send files to the host system 150 over a power/data connection 130. The power/data connection 130 can provide a power and/or data connection between the data storage device 100 and the communication interface 156 of the host system 150.

The data storage device 100 can employ a variety of storage technologies and/or form factors. For example, the data storage device 100 may be a solid-state drive (SSD), Secure Digital (SD) card, or a universal serial bus (USB) memory stick that uses semiconductor memory as the storage media 104. In other implementations, the data storage device 100 may be a hard disk drive (HDD) that uses magnetic disks as the storage media 104 or a solid-state hybrid drive (SSHD) that uses a combination of semiconductor memory and magnetic disk technology.

A network server(s) 170 can include any storage to which the host system 150 can connect over a network connection 132. For example, the network servers 170 may include web servers, cloud service, etc. The host system 150 can connect to a network server 170 over a network connection 132 using the network interface 158. Examples of network interface can include Wi-Fi, Bluetooth, ethernet, etc.

Figure 2:
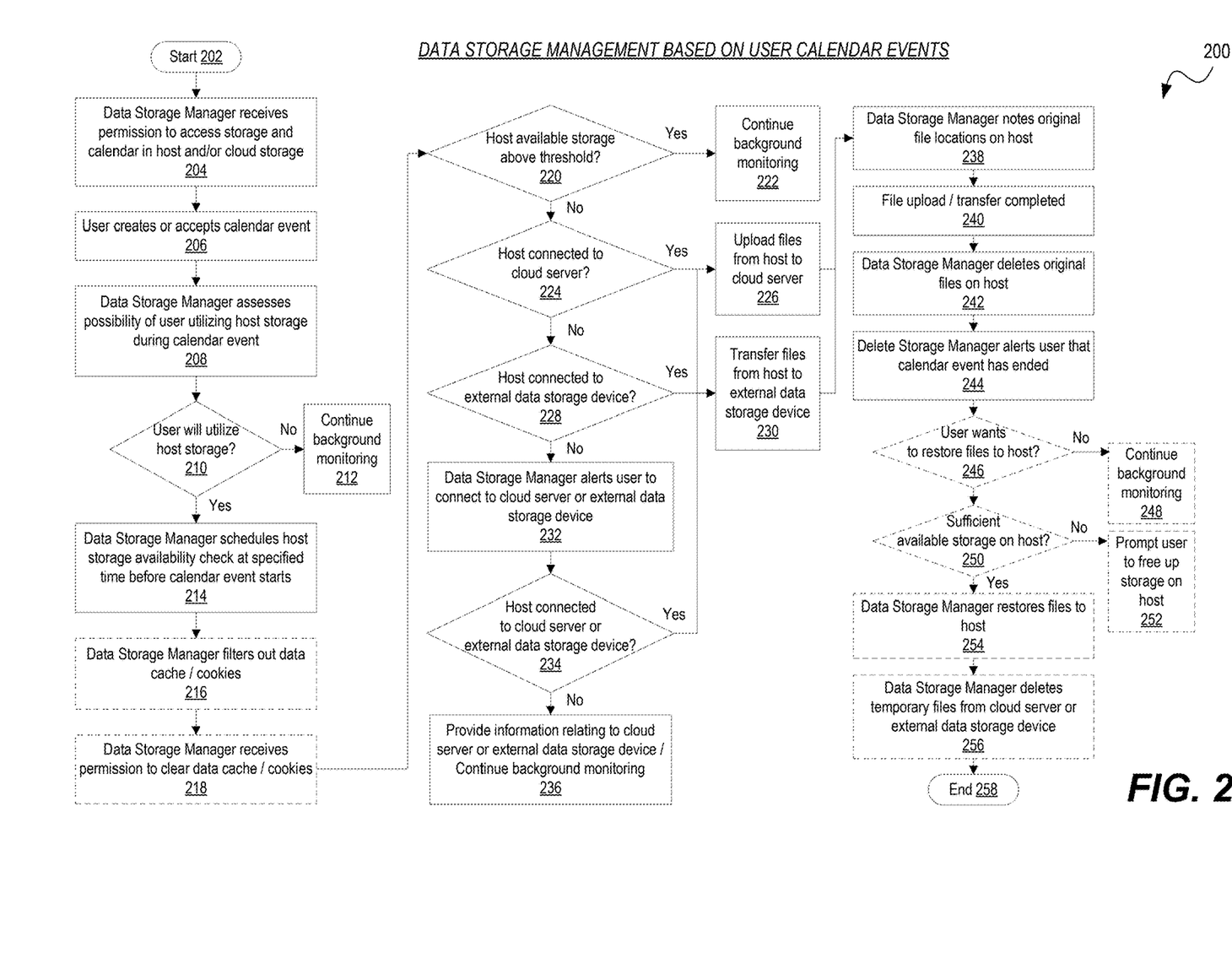
FIG. 2 illustrates a workflow process for data storage management based on user calendar events, according to certain embodiments.

FIG. 2 illustrates a workflow process 200 for providing data storage management based on user calendar events, according to one or more embodiments. The workflow process 200 may be implemented by a host system, such as a host system 150 in FIG. 1. For example, the workflow process 200 may be performed in part or in whole by a host system or one of its components, such as a processor, a data storage manager 110, etc. For illustrative purposes, the process 200 is explained below in connection with the host system 150 in FIG. 1. Certain details relating to the process 200 are explained in more detail with respect to FIG. 1. Depending on the embodiment, the process 200 may include fewer or additional blocks, and the blocks may be performed in an order that is different from illustrated.

The process 200 starts at block 202. The process can be performed by the data storage manager 110 of a host system 150. The host 150 can be associated with a user. The user may have a calendar available on the host 150 that includes events associated with the user. In some cases, the user may have an online calendar or a calendar that is backed up to or synchronized in cloud storage that may be accessed on the host 150.

At block 204, the data storage manager 110 receives permission to access storage and calendar in the host 150 and/or cloud storage. The user can grant permission for the data storage manager 110 to access storage associated with the user on the storage media 154 as well as a calendar associated with the user on the host 150 or cloud storage associated with the user.

At block 206, the user creates or accepts a calendar event. The user may create a calendar event in the user's calendar. The user may also accept a calendar event that is sent to the user, which can be saved to the user's calendar. A calendar event can have a start time and an end time associated with it.

At block 208, the data storage manager 110 assesses possibility of the user utilizing host storage during the calendar event. A calendar event may be associated with an event that is likely to require large amounts of storage. The data storage manager 110 can determine whether a calendar event is likely to consume host storage based on various criteria. Host storage can include storage media 154 on the host 150 that is available to the user. Examples of criteria for determining whether a calendar event is likely to consume host storage can include event type, venue, number of potential attendees, etc. Examples of event type may include concerts, sports games, exhibits, festivals, galas, weddings, awards, conventions, conferences, etc. Event type can include any event that usually has a large number of attendees and/or any events for which users are likely to generate large amounts of data, such as video files, picture files, etc. Examples of venue may include stadiums, convention centers, arenas, concert halls, museums, etc. Number of potential attendees can refer to potential attendance for an event. The number of potential attendees can be estimated or determined in various ways. For instance, the number of potential attendees may be determined based on venue capacity, number of people invited in the calendar event, number of people who have accepted the invite in the calendar event, average attendance from past events, number of confirmed attendees, other available sources, etc. In some cases, potential attendance may be considered in terms of density or number of people within a specified area (e.g., crowd density). Assessing possibility of the user utilizing host storage during a calendar event, for example, at block 208, may be performed when the user creates or accepts a calendar event at block 206, or at any other appropriate time. For instance, the data storage manager 110 may monitor calendar events associated with the user periodically to assess possibility of the user utilizing host storage. The data storage manager 110 can perform background monitoring for relevant calendar events.

At block 210, the data storage manager 110 determines whether the user will utilize host storage for the calendar event. As explained above in connection with block 208, the data storage manager 110 can determine whether a calendar event is likely to consume host storage based on various criteria, such as event type, venue, number of attendees. The data storage manager 110 can identify calendar events that likely require large amounts of storage based on artificial intelligence (AI) or machine learning (ML). For example, one or more machine learning models can be trained to identify calendar events that likely require large amounts of storage. Determining such large data events may be customized for the user.

If the data storage manager 110 determines that the user will not utilize host storage for the calendar event at block 210, the process 200 proceeds to block 212. At block 212, the process 200 continues background monitoring for further calendar events. For instance, the process 200 can monitor whether there are additional calendar events and determine whether they are likely to utilize host storage. If the data storage manager 110 determines that the user will utilize host storage for the calendar event at block 210, the process 200 proceeds to block 214.

At block 214, the data storage manager 110 schedules a host storage availability check at a specified time before the calendar event starts. The host storage availability check can be performed at a specified time before a start time associated with the event. The specified time can be determined appropriately, for example, based on how much advance notice would be helpful for the user to back up files from the host storage to cloud storage or external storage, how much time in advance would likely provide an accurate estimate of storage used/needed, etc. For instance, the specified time may be defined in units of days, hours, minutes, etc. prior to the start time of the event. The specified time may be the same for calendar events or may vary based on the calendar event. In some embodiments, the specified time may be determined based on AI or ML techniques.

In certain embodiments, the data storage manager 110 may perform a host storage availability check when specified criteria are met. As an example, if the data storage manager 110 determines that the user is at or near a venue associated with a calendar event, the data storage manager 110 may check if sufficient host storage is available and prompt the user as needed. The data storage manager 110 can determine whether the user is at a venue in connection with an event based on various criteria, such as proximity in time to the start time of the event, proximity in distance to the venue of the event, etc. For instance, the user may be passing by a venue without attending an event at the venue. Many variations are possible.

At block 216, the data storage manager 110 filters out data cache and cookies. To make more storage available to the user, the data storage manager 110 can determine whether some or all of the data cache and cookies can be cleared. At block 218, the data storage manager 110 receives permission to clear the data cache and cookies. If permission is received from the user, the data storage manager 110 clears some or all of the data cache and cookies. In some embodiments, blocks 216 and 218 may be optional.

At block 220, the data storage manager 110 determines whether host available storage is above a threshold. For instance, the host storage availability check that is scheduled at block 214 can be performed at block 220. In some embodiments, the threshold may be determined based on an expected amount of data associated with the calendar event. In other embodiments, the threshold may be a specified percentage or a specified amount of storage. The threshold may be indicated in any appropriate unit, such as gigabytes (GB), megabytes (MB), etc. In some embodiments, the data storage manager 110 can determine the threshold or an expected amount of data/storage associated with a calendar event based on AI or ML techniques. If the data storage manager 110 determines that the host available storage is above a threshold at block 220, the process 200 proceeds to block 222. For example, the data storage manager 110 determines that there is sufficient available storage on the host 150. At block 222, the process 200 continues background monitoring for further calendar events. For instance, the process 200 can monitor whether there are additional calendar events and determine whether they are likely to utilize host storage. If the data storage manager 110 determines that the host available storage is not above a threshold at block 220, the process 200 proceeds to block 224. For example, the data storage manager 110 determines that there is insufficient available storage on the host 150. In some embodiments, the process 200 can check whether host utilized storage is below a threshold and attempt to back up files if the host utilized storage is above the threshold.

At block 224, the data storage manager 110 determines whether the host 150 is connected to a cloud server. If the data storage manager 110 determines that the host 150 is connected to a cloud server at block 224, the process 200 proceeds to block 226. At block 226, the data storage manager 110 uploads files from the host 150 to the cloud server. The data storage manager 110 can identify one or more files that can be uploaded or backed up to the cloud server and receive confirmation from the user that all or some of the files can be uploaded to the cloud server. For example, the size of the identified files may be sufficient to make the host available storage meet or exceed the threshold at block 220 after removing the files from the host 150. The user can select some or all of the identified files to upload to the cloud server. If files selected by the user are not sufficient to make the host available storage meet or exceed the threshold at block 220, the data storage manager 110 can identify additional files for the user to select. In some embodiments, the user may grant permission to back up files identified by the data storage manager 110 without selecting or confirming which files to back up. Files can include any data associated with the user that can be backed up to a cloud server or an external data storage device and deleted from the host 150. The data storage manager 110 may identify files for backup based on AI or ML techniques. For example, one or more machine learning models can be trained to identify files that are candidates for back up. Determining such files may be customized for the user. As an example, the data storage manager 110 can identify that some large files have not been accessed for a period of time but have not been deleted by the user, indicating that the user may still need the files. In certain embodiments, the data storage manager 110 may identify files for backup that are larger than or equal to a specified file size. In some embodiments, the data storage manager 110 may identify files that are likely to be important to the user, for example, based on AI or ML techniques. The process 200 proceeds to block 238 after block 226. If the data storage manager 110 determines that the host is not connected to a cloud server at block 224, the process 200 proceeds to block 228.

At block 228, the data storage manager 110 determines whether the host 150 is connected to an external data storage device. If the data storage manager 110 determines that the host 150 is connected to an external data storage device at block 228, the process 200 proceeds to block 230. At block 230, the data storage manager 110 transfers files from the host 150 to the external data storage device. Similar to block 226, the data storage manager 110 can identify one or more files that can be copied or backed up to the external data storage device and receive confirmation from the user that all or some of the files can be transferred to the external data storage device. The user can select some or all of the identified files to transfer to the external data storage device. For example, the size of the identified files may be sufficient to make the host available storage meet or exceed the threshold at block 220 after removing the files from the host 150. If files selected by the user are not sufficient to make the host available storage meet or exceed the threshold at block 220, the data storage manager 110 can identify additional files for the user to select. In some embodiments, the user may grant permission to back up files identified by the data storage manager 110 without selecting or confirming which files to back up. The data storage manager 110 may identify files for back up based on AI or ML techniques. For example, one or more machine learning models can be trained to identify files that are candidates for back up. Determining such files may be customized for the user. The process 200 proceeds to block 238 after block 230. If the data storage manager 110 determines that the host 150 is not connected to an external data storage device at block 228, the process 200 proceeds to block 232.

In the example of FIG. 2, the process 200 checks whether the host 150 is connected to a cloud server before checking whether the host 150 is connected to an external data storage device. For instance, an external DSD may not be necessary if the user already has cloud service. However, the order in which availability of a particular type of external storage is checked can be different or switched. As an example, the order in which availability for different types of external storage is checked can be set based on user preference, determined based on AI/ML, etc. A cloud server and an external data storage device are mentioned as examples of external storage for illustrative purposes, and external storage can include any type of storage that is separate from host storage to which data can be backed up, for example, at least temporarily. In certain embodiments, the data storage manager 110 can further make more storage available on a cloud server or an external data storage device to make additional storage available for data associated with the calendar event by deleting unnecessary files from the cloud server or the external data storage device.

At block 232, the data storage manager 110 alerts the user to connect to a cloud server or an external data storage device. If the host 150 is not connected to a cloud server or an external data storage device when the host storage availability check is performed at block 220, the data storage manager 110 can provide a reminder to the user to connect to a cloud server or an external data storage device such that files can be moved to the cloud server or the external data storage device to increase host available storage for the calendar event. At block 234, the data storage manager 110 determines whether the host 150 is connected to a cloud server or an external data storage device. If the data storage manager 110 determines that the host 150 is connected to a cloud server or an external data storage device at block 234, the process 200 proceeds to block 226 or block 230. If the data storage manager 110 determines that the host 150 is not connected to a cloud server or an external data storage device at block 234, the process 200 proceeds to block 236. At block 236, the data storage manager 110 provides information relating to a cloud server or an external data storage device, and continues background monitoring. The data storage manager 110 can provide information relating to various options for cloud servers or external data storage devices such that the user can easily move files from the host storage to increase host available storage. The process 200 can also monitor whether there are additional calendar events and determine whether they are likely to utilize host storage.

At block 238, the data storage manager 110 notes original file locations on the host 150. When copying files to the cloud server or the external data storage device, the data storage manager 110 can remember the locations of the files such that if the user chooses to restore some or all of the files subsequent to the calendar event, the moved files can be restored to the original locations. In some embodiments, block 238 may be optional. At block 240, the file upload/transfer is completed. The data storage manager 110 can determine that files have been copied to the cloud sever or the external data storage device. At block 242, the data storage manager 110 deletes the original files on the host 150. For example, the data storage manager 110 can delete the copied files from the storage media 154. At block 244, the data storage manager 110 alerts the user that the calendar event has ended. When an end time associated with the calendar event is reached, the data storage manager 110 can notify that the user that the calendar event is over, for example, since the user may wish to restore some files if host storage is available. In some embodiments, block 244 may be optional.

At block 246, the data storage manager 110 determines whether the user wants to restore files to the host 150. In some embodiments, the data storage manager 110 may ask the user if the user wishes to restore files if sufficient host storage is available. For example, the data storage manager 110 can check whether the host available storage after the calendar event is above a threshold. If the data storage manager 110 determines that the user does not want to restore files to the host 150 at block 246, the process 200 proceeds to block 248. At block 248, the data storage manager 110 continues background monitoring for further calendar events. If the data storage manager 110 determines that the user wants to restore files to the host 150 at block 246, the process 200 proceeds to block 250.

At block 250, the data storage manager 110 determines whether there is sufficient available storage on the host 150. For example, the data storage manager 110 can check whether the host available storage after the calendar event is above a threshold. If the data storage manager 110 determines that there is not sufficient available storage on the host 150 at block 250, the process 200 proceeds to block 252. At block 252, the data storage manager 110 prompts the user to free up storage on the host 150. If the data storage manager 110 determines that there is sufficient available storage on the host 150 at block 250, the process 200 proceeds to block 254. At block 254, the data storage manager 110 restores files to the host 150. For example, the data storage manager 110 can restore one or more files from the cloud server or the external data storage device that are selected by the user for restoring. The files that are restored to the host 150 can depend on host storage availability. At block 256, the data storage manager 110 deletes temporary files from the cloud server or the external data storage device. In some embodiments, restoring files to the host 150 can be optional. For example, blocks 246, 248, 250, 252, 254, and 256 may be optional. The process 200 ends at block 258. Some or all of the blocks of the process 200 may be implemented based on AI or ML techniques and may be customized for the user.

As described above, the data storage manager 110 can provide a notification to a user that a calendar event that is likely to require large amounts of storage on the host 150 is upcoming and to make more storage available if desired by moving some files to external storage, such as cloud servers, external data storage devices. Users frequently generate large files at events such as concerts and sports games. Trying to back up files last minute at an event may be difficult since network connections at the event may not be available or stable, for example, to transfer large files. Moreover, the user may not have external data storage devices readily available. The data storage manager 110 can determine and check various criteria to provide notifications for relevant situations for the user. In cases storage is still available on the host 150 after the event, the user can restore moved files from the external storage back to the host 150.

Figure 3A:
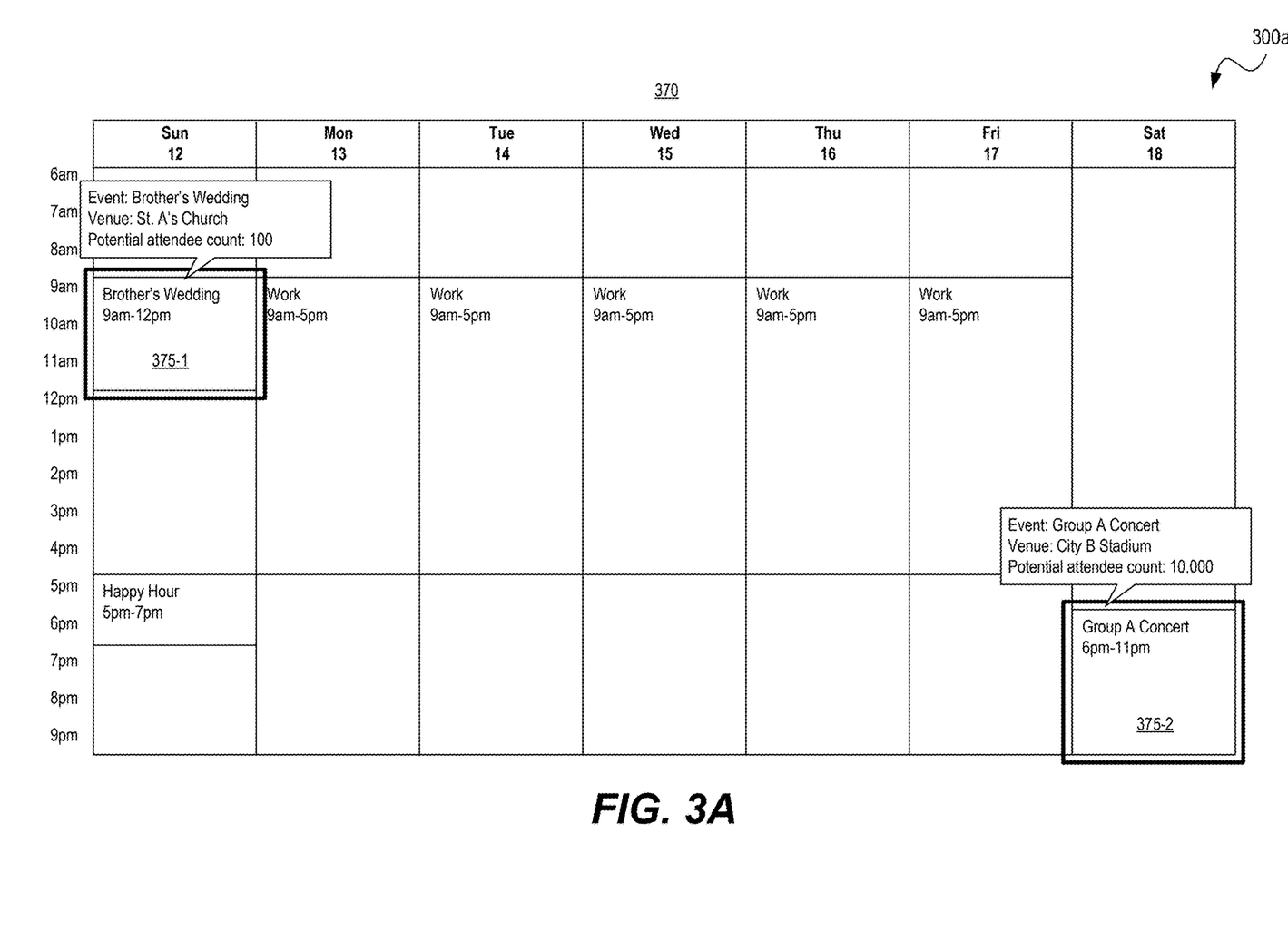
FIGS. 3A-3B illustrate block diagrams for a workflow process for data storage management based on user calendar events, according to certain embodiments.
Figure 3B:
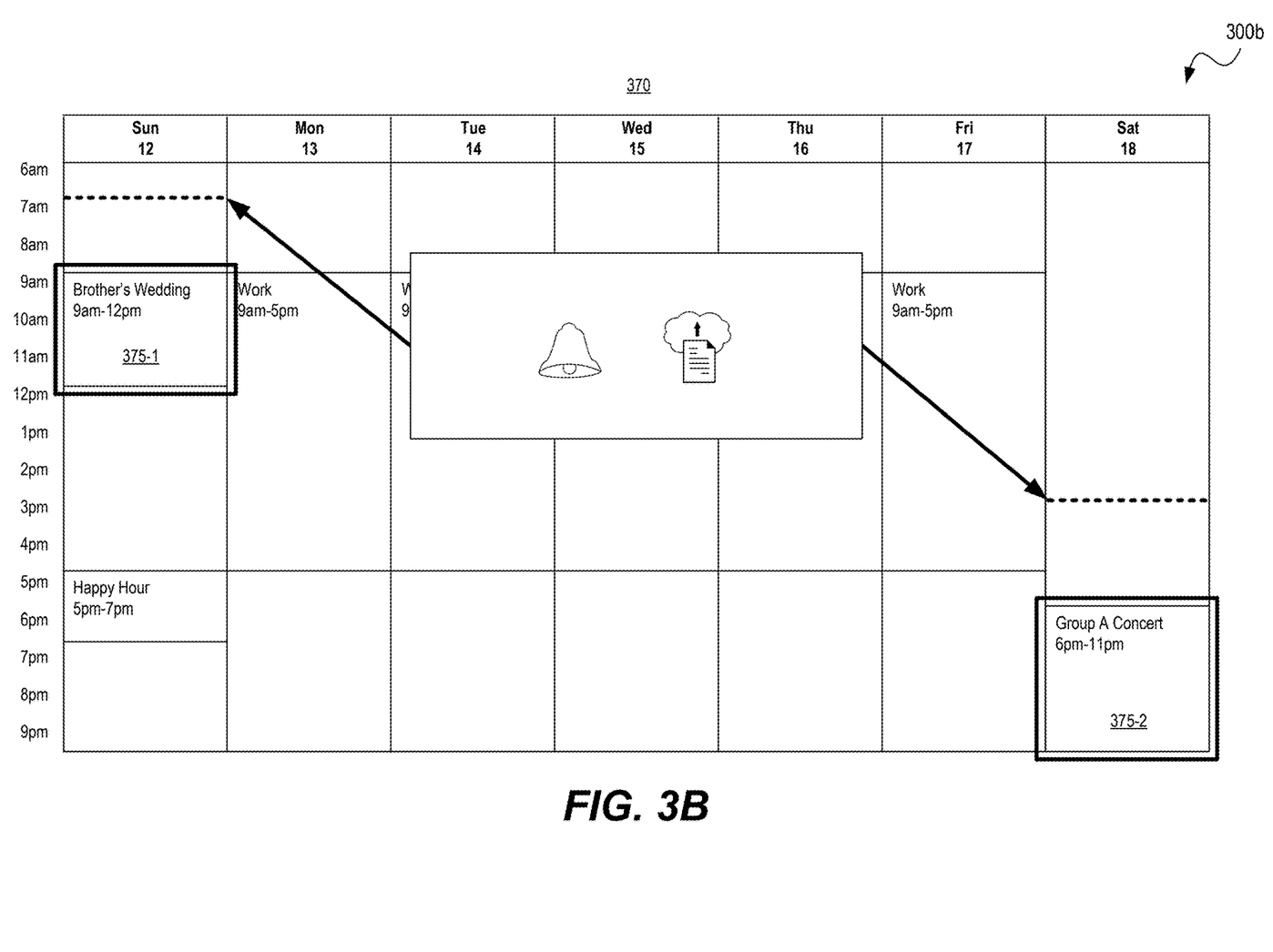

FIGS. 3A-3B illustrate block diagrams 300*a*-300*b* for a workflow process for data storage management based on user calendar events, according to certain embodiments. For example, the workflow process may be performed in part or in whole by a host system or one of its components, such as a processor, a data storage manager 110, etc. Certain details relating to the process are explained in more detail with respect to FIGS. 1-2.

The example of FIGS. 3A-3B shows a calendar 370 that includes multiple calendar event associated with a user. For instance, calendar events can include work day events, weddings, happy hours, concerts, etc. Events 375-1 and 375-2 can be identified as events that are likely to require large amounts of storage on a host device associated with the user. Examples of a host device can include a mobile phone, a tablet, a portable device, a laptop, etc. Events 375-1 and 375-2 may be identified based on various factors, such as event type, venue, potential attendance, etc. For instance, the events can be identified based on artificial intelligence or machine learning techniques. One or more machine learning models may be trained to identify events that are likely to require large amounts of data on a user device. In the example of FIGS. 3A-3B, Event 375-1 is a wedding. For instance, the event type can be wedding, the venue can be a church, and potential attendance can be 100. Event 375-2 is a concert. For instance, the event type can be concert, the venue can be a stadium, and potential attendance can be 10,000. Large data events can be identified as calendar events are created or accepted by the user. Large data events may also be identified by periodically monitoring calendar events. In some cases, large data events may also be identified as calendar events are modified.

In the example of FIG. 3B, a notification or an alert can be provided to the user on the host device at a specified time before a large data event to copy files to external storage. The specified time can be determined as appropriate for each large data event. Or the specified time can be the same for different large data events. In the example of FIG. 3B, the specified time for the notification for Event 375-1 is 2 hours before the event start time, and the specified time for the notification for Event 375-2 is 3 hours before the event start time. The specified time can be selected such that the notification can be helpful to the user in obtaining sufficient storage on the host device prior to the event. A notification too close to the event start time may not provide sufficient time for the user to take action in a timely manner. A notification too far in advance before the event start time may not provide an accurate assessment of how much storage should be made available. In some cases, determining a specified time for a notification for an event can also be based on AI or ML and can be customized for the user. After receiving the notification, the user can take appropriate actions to back up files to a cloud server or an external data storage device.

Figure 4:
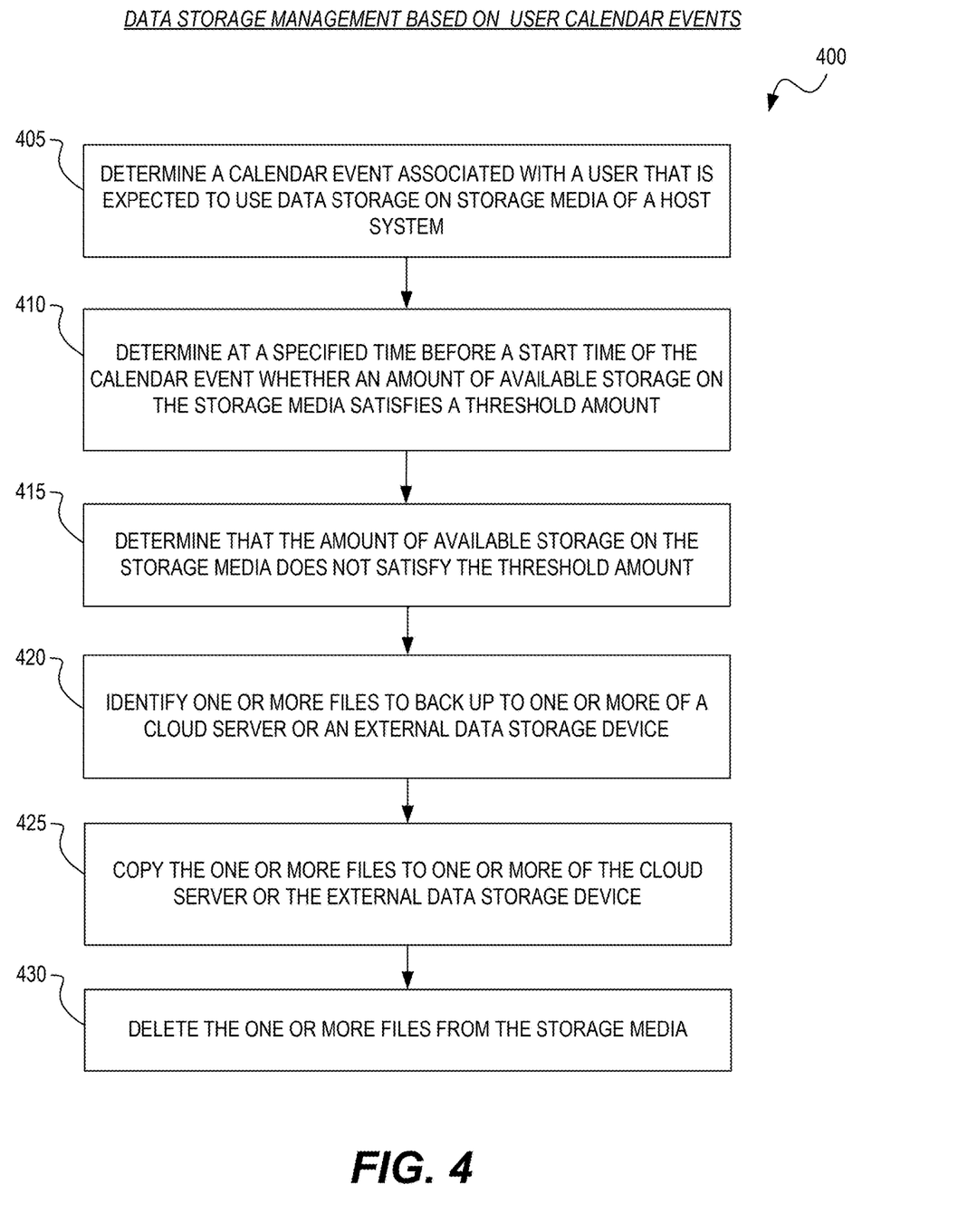
FIG. 4 illustrates a workflow process for data storage management based on user calendar events, according to certain embodiments.

FIG. 4 illustrates a workflow process 400 for data storage management based on user calendar events, according to one or more embodiments. The workflow process 400 may be implemented by a host system, such as a host system 150 in FIG. 1. For example, the workflow process 400 may be performed in part or in whole by a host system or one of its components, such as a processor, a data storage manager 110, etc. For illustrative purposes, the process 400 is explained below in connection with the host system 150 in FIG. 1. Certain details relating to the process 400 are explained in more detail with respect to FIGS. 1-3. Depending on the embodiment, the process 400 may include fewer or additional blocks, and the blocks may be performed in an order that is different from illustrated.

At block 405, the host system 150 can determine a calendar event associated with a user that is expected to use data storage on the storage media of the host system 150.

The host system 150 can determine the calendar event associated with the user that is expected to use data storage on the storage media based on event criteria. For example, the event criteria can include one or more of: an event type, a venue, or a potential attendance. In some embodiments, the host system 150 can include storage media configured to store data files, a communication interface configured to communicate with a data storage device that is a separate device from the host system 150, and a network interface configured to communicate with a network server.

At block 410, the host system 150 can determine at a specified time before a start time of the calendar event whether an amount of available storage on the storage media satisfies a threshold amount. In some embodiments, the host system 150 can determine the threshold amount based on a percentage of storage in the storage media. In other embodiments, the host system 150 can determine the threshold amount based on a specified amount of storage. In certain embodiments, the host system 150 can determine the threshold amount based on an expected amount of data storage associated with the calendar event. In some cases, the specified time can be the same for calendar events. In other cases, the specified time can be variable based on the calendar event. The specified time may be specified in day(s), hour(s), minute(s), etc. as appropriate.

At block 415, the host system 150 can determine that the amount of available storage on the storage media does not satisfy the threshold amount. In some embodiments, the host system 150 can, in response to determining that the amount of available storage on the storage media does not satisfy the threshold amount, determine whether the host system is connected to a cloud server or an external data storage system. In certain embodiments, the host system 150 can, in response to determining that the host system 150 is not connected to a cloud server and an external data storage device, provide information relating to a cloud server or an external data storage device to a user associated with the host system 150.

At block 420, the host system 150 can identify one or more files to back up to one or more of a cloud server or an external data storage device. At block 425, the host system 150 can copy the one or more files to one or more of the cloud server or the external data storage device. At block 430, the host system 150 can delete the one or more files from the storage media.

In some embodiments, the host system 150 can clear data cache and cookies to make more storage available on the storage media. In certain embodiments, the host system 150 can restore some or all of the one or more files copied to one or more of the cloud server or the external data storage device to the storage media. For instance, the host system 150 can restore some or all of the one or more files copied to one or more of the cloud server of the external data storage device to the storage media subsequent to an end time associated with the calendar event.

Example Data Storage Device and Host System

Figure 5:
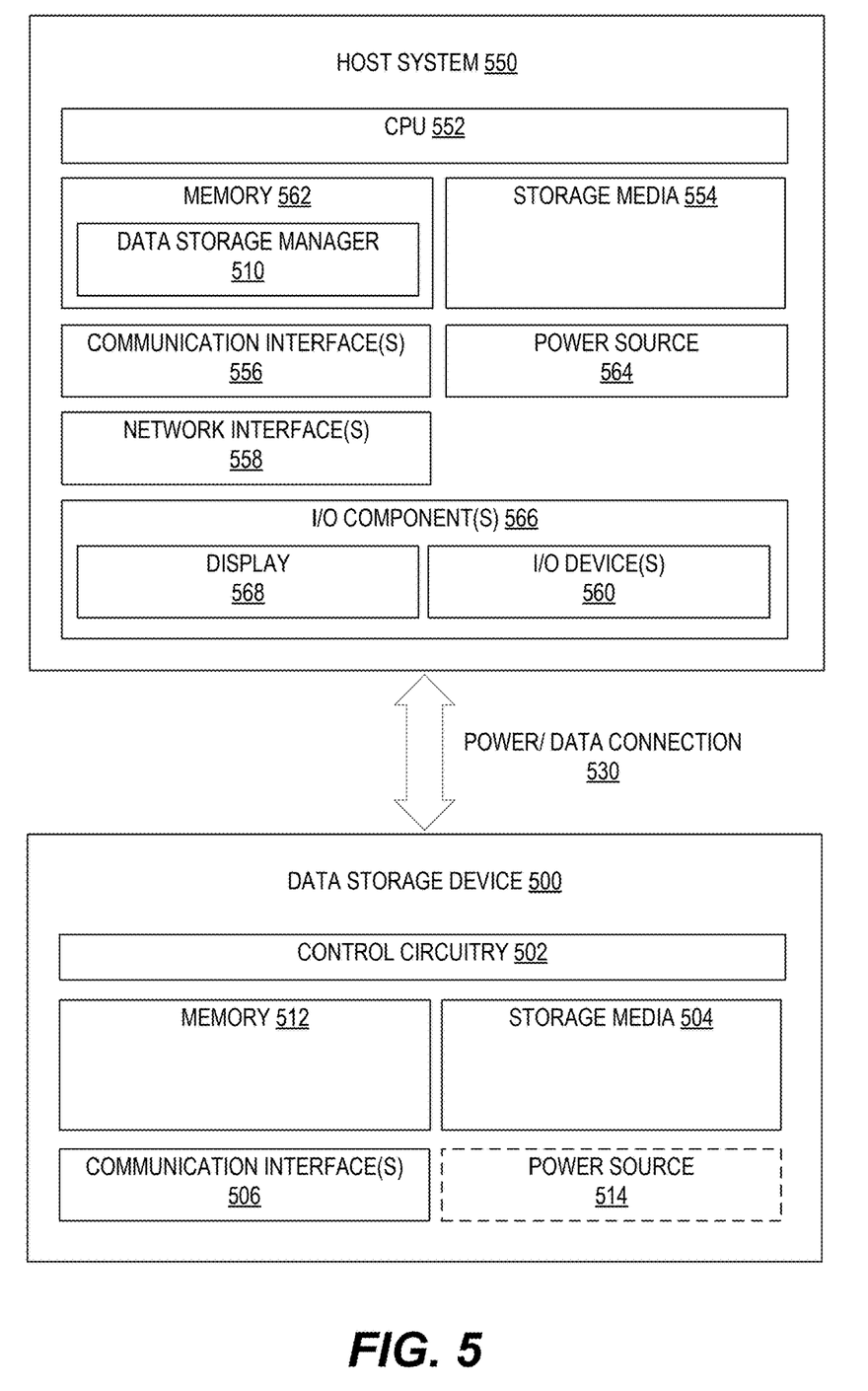
FIG. 5 illustrates a block diagram providing example details of a data storage device and a host system, according to certain embodiments.

FIG. 5 illustrates example details of a data storage device 500 and a host system 550, according to certain embodiments. As illustrated, the host system 550 can include one or more of the following components, devices, modules, and/or units (referred to herein as "components"), either separately/ individually and/or in combination/collectively: one or more central processing units (CPUs) 552 or other type of processor, memory 562, one or more communication interfaces 556, one or more network interfaces 558, a power source 564 (e.g., battery or power supply unit), and/or one or more I/O components 566.

In some embodiments, the host system 550 can comprise a housing/enclosure configured and/or dimensioned to house or contain at least part of one or more of the components of the host system 550. In some embodiments, the storage media 554 may be housed internally in the enclosure of the host system 550. For example, the host system 550 may be a server or desktop system in case or rack mount enclosure with one or more storage drives in the case or enclosure. The host system 550 may be in a first enclosure, while the data storage device 500 may be external to the host system, being in a second enclosure different from the first enclosure.

The memory 562 can employ a variety of storage technologies and/or form factors and can include various types of volatile memory, such as Random Access Memory (RAM). RAM is a type of computer memory that serves as a temporary storage area for data and instructions that are actively being used by a computer's operating system, applications, and processes. RAM is volatile memory, meaning that its contents are lost when the computer is powered off or restarted. RAM provides fast and temporary access to data, enabling the CPU 552 to quickly retrieve and manipulate the information it needs to perform tasks.

The memory 562 can include programs that are running on the host system 550, such as a data storage manager 510. The data storage manager 510 can provide data storage management based on user calendar events as described herein. For example, the data storage manager 510 can be similar to the data storage manager 110 in FIG. 1. The data storage manager 510 may be implemented in different devices depending on the embodiment. For example, the data storage manager 510 may be implemented in a host system, a data storage device, a network server, etc. The data storage manager may be a program, driver, browser extension, or the like that runs on a processor of the host system 550.

In addition, the host system 550 may also include nonvolatile memory or storage media 554 for permanently storing data, such as important files. The storge media 554 may be an internal storage drive, such as an SSD, SSHD, or HDD. A permanent copy of the data storage manager 510 can be stored in the storage media 554 and then copied to memory 562 for running the program.

The one or more communication interfaces 556 can be a data interface that includes connectors, cables, and/or protocols for connection, communication, and/or power supply between host systems and the data storage device 500. In some embodiments, a port of the data interface can enable transfer of both data and power to connected devices. In some embodiments, the data interface comprises USB hardware and/or software. Various versions of USB can be used, such as USB 2.x, USB 3.x, or USB 4.x. The data interface can include a physical port for coupling with connectors and cables. Various types of USB ports can be included on the data storage device 500, such as male or female Type A, Type B, Type C, mini, and/or micro connectors. Other data interface standards can also be used, such as external SATA (eSATA), ExpressCard, FireWire (IEEE 1364), and Thunderbolt. The data interface can include a port for connecting with a cable and/or a corresponding port on the data storage device 500, forming a power/data connection 530 with the data storage device 500.

The power source 564 can be configured to provide/manage power for the host system 550. The power source 564 can comprise one or more devices and/or circuitry configured to provide a source of power and/or provide power management functionality. Moreover, in some embodiments the power source 564 includes a mains power connector that is configured to couple to an alternating current (AC) or direct current (DC) mains power source. In some embodiments, the power source can include one or more batteries, such as a lithium-based battery, a lead-acid battery, an alkaline battery, and/or another type of battery.

The one or more I/O components 566 can include a variety of components to receive input and/or provide output. The one or more I/O components 566 can be configured to receive touch, speech, gesture, biometric data, or any other type of input. For example, the one or more I/O components 566 can be used to provide input regarding control of the host system 550, such as opening files, entering logins, plays, and/or changing settings. As shown, the one or more I/O components 566 can include a display 568 configured to display data and various user interfaces. The display 568 can include one or more liquid-crystal displays (LCD), light-emitting diode (LED) displays, organic LED displays, plasma displays, electronic paper displays, and/or any other type(s) of technology. In some embodiments, the display 568 can include one or more touchscreens configured to receive input and/or display data. Further, the one or more I/O components 566 can include the one or more input/output devices 560, which can include a touchscreen, touch pad, controller, mouse, keyboard, wearable device (e.g., optical head-mounted display), virtual or augmented reality device (e.g., head-mounted display), etc.

As illustrated, the data storage device 500 can include one or more of the following components, devices, modules, and/or units (referred to herein as "components"), either separately/individually and/or in combination/collectively: control circuitry 502, storage media 504, communication interfaces 506, memory 512, and/or optionally a power source 514 (e.g., battery or power supply unit). In some embodiments, the data storage device 500 can comprise a housing/enclosure configured and/or dimensioned to house or contain the components of the data storage device 500. In some examples, the data storage device 500 does not have its own power source but receives power only from the host system 550 via the power/data connection 530.

The data storage device 500 may be an external storage drive, SD card, flash drive, or a USB memory stick that uses semiconductor memory as the storage media. For example, the data storage device 500 may be an external drive that is connected to the host system 550 via an external port, such as USB. In other examples, the data storage device 500 may be an SD card, a microSD card, or another type of flash card that is readable from a memory reader of the host system 550. In other implementations, the data storage device 500 may be an external storage drive that uses an HDD that uses magnetic disks as the storage media, an SSHD that uses a combination of semiconductor memory and magnetic disk technology, or a tape drive that uses tape media.

Although certain components of the data storage device 500 and host system 550 are illustrated in FIG. 5, it should be understood that additional components not shown can be included in embodiments in accordance with the present disclosure. Furthermore, certain of the illustrated components can be omitted in some embodiments. Although the control circuitry 502 is illustrated as a separate component, it should be understood that any or all of the remaining components of the data storage device 500 can be embodied at least in part in the control circuitry 502. That is, the control circuitry 502 can include various devices (active and/or passive), semiconductor materials and/or areas, layers, regions, and/or portions thereof, conductors, leads, vias, connections, and/or the like, wherein one or more of the other components of the data storage device 500 and/or portion(s) thereof can be formed and/or embodied at least in part in/by such circuitry components/devices.

The various components of the data storage device 500 can be electrically and/or communicatively coupled using certain connectivity circuitry/devices/features, which can or may not be part of the control circuitry 502. For example, the connectivity feature(s) can include one or more printed circuit boards configured to facilitate mounting and/or interconnectivity of at least some of the various components/circuitry of the data storage device 500. In some embodiments, two or more of the control circuitry 502, the storage media 504, the communication interface(s) 506, the memory 512, and/or the power source 514, can be electrically and/or communicatively coupled to each other.

The storage media 504 can utilize various types of non-volatile memory (NVM) to permanently store data. NVM is a type of computer memory that can retain stored information even after power is removed. For example, the storage media 504 can include one or more magnetic disks and/or semiconductor memory. The semiconductor memory can include any of various memory technologies, such as NAND memory and its variations like SLC, eMLC (Enterprise Multi Level Cell), MLC, TLC, and QLC. New types of emerging non-volatile memory could also be used such as Program in Place or Storage Class Memory (SCM) such as ReRam, Phase-Change Memory (PCM), and Magnetoresistive Random-Access Memory (MRAM).

The one or more communication interfaces 506 can be configured to communicate with one or more device/sensors/systems. For example, the one or more communication interfaces 506 can send/receive data over a network. A network in accordance with embodiments of the present disclosure can include a local area network (LAN), wide area network (WAN) (e.g., the Internet), personal area network (PAN), body area network (BAN), etc.

The one or more communication interfaces 506 can be a data interface that includes connectors, cables, and/or protocols for connection, communication, and/or power supply between the host system 550 and the data storage device 500. In some embodiments, a port of the data interface can enable transfer of both data and power to connected devices. In some embodiments, the data interface comprises USB hardware and/or software. Various versions of USB can be used, such as USB 2.x, USB 3.x, or USB 4.x. The data interface can include a physical port for coupling with connectors and cables. Various types of USB ports can be included on the data storage device 500, such as male or female Type A, Type B, Type C, mini, and/or micro connectors. Other data interface standards can also be used, such as external SATA (eSATA), ExpressCard, FireWire (IEEE 1364), and Thunderbolt. The data interface can include a port for connecting with a cable and/or a corresponding port on the host system 550, forming the power/data connection 530.

The optional power source 514 can be configured to provide/manage power for the data storage device 500. In some embodiments, the power source can include one or more batteries, such as a lithium-based battery, a lead-acid battery, an alkaline battery, and/or another type of battery. In some embodiments the power source 514 includes a mains power connector that is configured to couple to an alternating current (AC) or direct current (DC) mains power source. However, in some embodiments, the data storage device 500 may not include an internal power source but be configured to receive power through the communication interface 506, such as via a USB connection.

The term "control circuitry" is used herein according to its broad and ordinary meaning, and can refer to any collection of one or more processors, processing circuitry, processing modules/units, chips, dies (e.g., semiconductor dies including one or more active and/or passive devices and/or connectivity circuitry), microprocessors, micro-controllers, digital signal processors, microcomputers, central processing units, graphics processing units, field programmable gate arrays, programmable logic devices, state machines (e.g., hardware state machines), logic circuitry, analog circuitry, digital circuitry, and/or any device that manipulates signals (analog and/or digital) based on hard coding of the circuitry and/or operational instructions. They may be configured to work individually or in combination. Control circuitry can further comprise one or more data storage devices, which can be embodied in a single memory device, a plurality of memory devices, and/or embedded circuitry of a device. Such data storage can comprise read-only memory, random access memory, volatile memory, non-volatile memory, static memory, dynamic memory, flash memory, cache memory, data storage registers, and/or any device that stores digital information. It should be noted that in embodiments in which control circuitry comprises a hardware state machine (and/or implements a software state machine), analog circuitry, digital circuitry, and/or logic circuitry, data storage device(s)/register(s) storing any associated operational instructions can be embedded within, or external to, the circuitry comprising the state machine, analog circuitry, digital circuitry, and/or logic circuitry.

The term "memory" is used herein according to its broad and ordinary meaning and can refer to any suitable or desirable type of computer-readable media. For example, computer-readable media can include one or more volatile data storage devices, non-volatile data storage devices, removable data storage devices, and/or nonremovable data storage devices implemented using any technology, layout, and/or data structure(s)/protocol, including any suitable or desirable computer-readable instructions, data structures, program modules, or other types of data.

Computer-readable media that can be implemented in accordance with embodiments of the present disclosure includes, but is not limited to, phase change memory, static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic data storage devices, or any other non-transitory medium that can be used to store information for access by a computing device. As used in certain contexts herein, computer-readable media may not generally include communication media, such as modulated data signals and carrier waves. As such, computer-readable media should generally be understood to refer to non-transitory media.

Additional Embodiments

Those skilled in the art will appreciate that in some embodiments, other types of data storage devices can be implemented while remaining within the scope of the present disclosure. In addition, the actual steps taken in the processes discussed herein may differ from those described or shown in the figures. Depending on the embodiment, certain of the steps described above may be removed, others may be added, and the order may be rearranged.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer data storage device or collection of data storage devices. Some or all of the methods may alternatively be embodied in specialized computer hardware.

What is claimed is:

1. A host system configured to manage data storage, the host system comprising:
   storage media configured to store data files;
   a communication interface configured to communicate with a data storage device that is a separate device from the host system;
   a network interface configured to communicate with a network server; and
   one or more processors, individually or in combination, configured to:
      determine a calendar event associated with a user that is expected to use data storage on the storage media;
      determine at a specified time before a start time of the calendar event whether an amount of available storage on the storage media satisfies a threshold amount; and
      in response to determining that the amount of available storage on the storage media does not satisfy the threshold amount:
         identify one or more files to back up to one or more of a cloud server or an external data storage device;
         copy the one or more files to one or more of the cloud server or the external data storage device;
         delete the one or more files from the storage media; and
         clear data cache and cookies to make more storage available on the storage media.

2. The host system of claim 1, wherein the one or more processors, individually or in combination, are further configured to determine the calendar event associated with the user that is expected to use data storage on the storage media based on event criteria.

3. The host system of claim 2, wherein the event criteria include one or more of: an event type, a venue, or a potential attendance.

4. The host system of claim 1, wherein the one or more processors, individually or in combination, are further configured to determine the threshold amount based on a percentage of storage in the storage media.

5. The host system of claim 1, wherein the one or more processors, individually or in combination, are further configured to determine the threshold amount based on a specified amount of storage.

6. The host system of claim 1, wherein the specified time is the same for calendar events.

7. The host system of claim 1, wherein the specified time is variable based on the calendar event.

8. The host system of claim 1, wherein the one or more processors, individually or in combination, are further configured to restore some or all of the one or more files copied to one or more of the cloud server or the external data storage device to the storage media.

9. The host system of claim 1, wherein the one or more processors, individually or in combination, are further configured to:
   in response to determining that the amount of available storage on the storage media does not satisfy the threshold amount, determine whether the host system is connected to a cloud server or an external data storage system.

10. A host system configured to manage data storage, the host system comprising:
    storage media configured to store data files;
    a communication interface configured to communicate with a data storage device that is a separate device from the host system;
    a network interface configured to communicate with a network server; and
    one or more processors, individually or in combination, configured to:
       determine a calendar event associated with a user that is expected to use data storage on the storage media;
       determine at a specified time before a start time of the calendar event whether an amount of available storage on the storage media satisfies a threshold amount;
       determine the threshold amount based on an expected amount of data storage associated with the calendar event; and
       in response to determining that the amount of available storage on the storage media does not satisfy the threshold amount:
          identify one or more files to back up to one or more of a cloud server or an external data storage device;
          copy the one or more files to one or more of the cloud server or the external data storage device; and
          delete the one or more files from the storage media.

11. A host system configured to manage data storage, the host system comprising:
    storage media configured to store data files;
    a communication interface configured to communicate with a data storage device that is a separate device from the host system;
    a network interface configured to communicate with a network server; and one or more processors, individually or in combination, configured to:
- determine a calendar event associated with a user that is expected to use data storage on the storage media;
- determine at a specified time before a start time of the calendar event whether an amount of available storage on the storage media satisfies a threshold amount;
- in response to determining that the amount of available storage on the storage media does not satisfy the threshold amount, determine whether the host system is connected to a cloud server or an external data storage device;
- in response to determining that the host system is not connected to the cloud server and the external data storage device, provide information relating to the cloud server or the external data storage device to a user associated with the host system; and
- in response to determining that the amount of available storage on the storage media does not satisfy the threshold amount:
  - identify one or more files to back up to one or more of the cloud server or the external data storage device;
  - copy the one or more files to one or more of the cloud server or the external data storage device; and
  - delete the one or more files from the storage media.

12. A method of managing data storage in a host system, the method comprising:
- determining a calendar event associated with a user that is expected to use data storage on storage media of the host system:
- determining at a specified time before a start time of the calendar event whether an amount of available storage on the storage media satisfies a threshold amount;
- determining the threshold amount based on an expected amount of data storage associated with the calendar event; and
- in response to determining that the amount of available storage on the storage media does not satisfy the threshold amount:
  - identifying one or more files to back up to one or more of a cloud server or an external data storage device;
  - copying the one or more files to one or more of the cloud server or the external data storage device; and
  - deleting the one or more files from the storage media.

13. The method of claim 12, wherein the determining the calendar event associated with the user that is expected to use data storage on the storage media is based on event criteria.

14. The method of claim 13, wherein the event criteria include one or more of: an event type, a venue, or a potential attendance.

15. The method of claim 12, further comprising determining the threshold amount based on a percentage of storage in the storage media.

16. The method of claim 12, further comprising determining the threshold amount based on a specified amount of storage.

17. The method of claim 12, further comprising restoring some or all of the one or more files copied to one or more of the cloud server or the external data storage device to the storage media.

18. A host system configured to manage data storage, the host system comprising:
- means for storing data files;
- means for communicating with a data storage device that is a separate device from the host system;
- means for communicating with a network server; and
- one or more processors, individually or in combination, configured to:
  - determine a calendar event associated with a user that is expected to use data storage on the means for storing data files;
  - determine at a specified time before a start time of the calendar event whether an amount of available storage on the means for storing data files satisfies a threshold amount; and
  - in response to determining that the amount of available storage on the means for storing data files does not satisfy the threshold amount:
    - identify one or more files to back up to one or more of a cloud server or an external data storage device;
    - copy the one or more files to one or more of the cloud server or the external data storage device;
    - delete the one or more files from the means for storing data files; and
    - clear data cache and cookies to make more storage available on the means for storing data files.

19. The host system of claim 18, wherein the expecting to use the data storage is associated with an event type, venue, and number of potential attendees.

20. The host system of claim 18, wherein the determining the calendar event is performed periodically.

* * * * *